(12) United States Patent
Wei et al.

(10) Patent No.: US 11,775,194 B2
(45) Date of Patent: Oct. 3, 2023

(54) DATA STORAGE METHOD AND APPARATUS IN DISTRIBUTED STORAGE SYSTEM, AND COMPUTER PROGRAM PRODUCT

(71) Applicant: Huawei Cloud Computing Technologies Co., Ltd., Guizhou (CN)

(72) Inventors: Mingchang Wei, Shenzhen (CN); Daohui Wang, Shenzhen (CN); Chi Song, Shenzhen (CN); Rong Rao, Shenzhen (CN)

(73) Assignee: HUAWEI CLOUD COMPUTING TECHNOLGOIES CO., LTD., Guizhou (CN)

( * ) Notice: Subject to any disclaimer, the term of this patent is extended or adjusted under 35 U.S.C. 154(b) by 76 days.

(21) Appl. No.: 17/358,682

(22) Filed: Jun. 25, 2021

(65) Prior Publication Data

US 2021/0318826 A1    Oct. 14, 2021

Related U.S. Application Data

(63) Continuation of application No. PCT/CN2018/123349, filed on Dec. 25, 2018.

(51) Int. Cl.
*G06F 12/00* (2006.01)
*G06F 3/06* (2006.01)

(52) U.S. Cl.
CPC ............ *G06F 3/0644* (2013.01); *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| 2006/0155946 | A1 | 7/2006 | Ji |
| 2009/0271412 | A1* | 10/2009 | Lacapra ............... G06F 16/178 |
| 2016/0283160 | A1 | 9/2016 | Trika et al. |
| 2016/0357440 | A1* | 12/2016 | Wang .................... G06F 3/0604 |
| 2017/0206135 | A1 | 7/2017 | Zeng |
| 2017/0293533 | A1 | 10/2017 | Fang |
| 2019/0146681 | A1 | 5/2019 | Cao |
| 2020/0125286 | A1 | 4/2020 | Wang et al. |

FOREIGN PATENT DOCUMENTS

| CN | 103535014 A | 1/2014 |
| CN | 104932953 A | 9/2015 |
| CN | 105242879 A | 1/2016 |
| CN | 105404469 A | 3/2016 |
| CN | 105471930 A | 4/2016 |
| CN | 106662983 A | 5/2017 |

(Continued)

*Primary Examiner* — Daniel D Tsui
(74) *Attorney, Agent, or Firm* — Conley Rose, P.C.

(57) ABSTRACT

A data storage method implemented by a storage node in a distributed storage system includes receiving first data of a first strip in a first stripe, wherein the first stripe comprises a first plurality of strips, receiving second data of a second strip in a second stripe, wherein the second strip comprises a second plurality of strips, wherein a first logical address of the first data is the same as a second logical address of the second data, and generating a record indicating that the first data reaches the storage node before the second data.

20 Claims, 6 Drawing Sheets

(56) References Cited

FOREIGN PATENT DOCUMENTS

| CN | 107436725 | A | 12/2017 |
| CN | 107436733 | A | 12/2017 |
| CN | 107844268 | A | 3/2018 |
| CN | 107908499 | A | 4/2018 |
| CN | 108491290 | A | 9/2018 |
| WO | 2017088572 | A1 | 6/2017 |

* cited by examiner

DATA STORAGE METHOD AND APPARATUS IN DISTRIBUTED STORAGE SYSTEM, AND COMPUTER PROGRAM PRODUCT

CROSS-REFERENCE TO RELATED APPLICATIONS

This application is a continuation of International Patent Application No. PCT/CN2018/123349 filed on Dec. 25, 2018, the disclosure of which is hereby incorporated by reference in its entirety.

TECHNICAL FIELD

The present disclosure relates to the field of information technologies, and in particular, to a data storage method and apparatus in a distributed storage system, and a computer program product.

BACKGROUND

A distributed storage system includes a storage node and a stripe, each stripe includes a plurality of strips, and a storage node corresponds to a strip in the stripe, that is, a storage node provides storage space for a strip in the stripe. Generally, as shown in FIG. 1, a plurality of storage nodes may include a primary storage node (a storage node 1). The primary storage node is configured to receive data sent by a client, and then the primary storage node selects a stripe, divides the data into data of strips, and sends data of strips stored in other storage nodes to corresponding storage nodes (a storage node 2, a storage node 3, and a storage node 4). The foregoing operations ensure data consistency in the distributed storage system, but the primary storage node may easily become a data writing bottleneck. In addition, data interaction between the storage nodes is increased, and write performance of the distributed storage system is reduced.

SUMMARY

This application provides a data storage method and apparatus in a distributed storage system, and a computer program product, without requiring a primary storage node, so that under the premise of ensuring data consistency, data interaction between storage nodes is reduced, and write performance of the distributed storage system is improved.

A first aspect of this application provides a data storage method in a distributed storage system. The distributed storage system includes M storage nodes $N_j$, and j is an integer ranging from 1 to M. In this method, the storage node $N_j$ receives data of a strip $SU_{Nj}$ in a stripe $S_N$, where the stripe $S_N$ includes M strips $SU_{Nj}$; the storage node $N_j$ receives data of a strip $SU_{Kj}$ in a stripe $S_K$, where a logical address of the data of the strip $SU_{Kj}$ is the same as a logical address of the data of the strip $SU_{Nj}$, N is different from K, and the stripe $S_K$ includes M strips $SU_{Kj}$; and the storage node $N_j$ generates a record, where the record is used to indicate that the data of the strip $SU_{Nj}$ reaches the storage node $N_j$ before the data of the strip $SU_{Kj}$. In this data storage method, the storage node $N_j$ receives the data of the strip $SU_{Nj}$ and the data of the strip $SU_{Kj}$ directly from a client and indicates, by using the record, that the data of the strip $SU_{Nj}$ reaches the storage node $N_j$ before the data of the strip $SU_{Kj}$, so that when the storage node $N_j$ stores a plurality of pieces of data of the same logical address, data of a latest version may be determined based on the record. In this data storage method, a primary storage node is not required, and therefore, data interaction between storage nodes is reduced, and write performance of the distributed storage system is improved.

In implementation, the record in the first aspect of this application may indicate, based on an identifier of the strip $SU_{Nj}$ and an identifier of the strip $SU_{Kj}$, that the data of the strip $SU_{Nj}$ reaches the storage node $N_j$ before the data of the strip $SU_{Kj}$. The data of the strip $SU_{Nj}$ and the data of the strip $SU_{Kj}$ may be sent by a same client or by different clients.

With reference to the first aspect of this application, in a possible implementation, the storage node $N_j$ backs up the record to one or more other storage nodes in the M storage nodes, to improve reliability of the record. When the storage node $N_j$ becomes faulty, the record is obtained from a storage node in which the record is backed up, and between the restored data of the strip $SU_{Nj}$ and the restored data of the strip $SU_{Kj}$, the data of the strip $SU_{Kj}$ is determined as latest data based on the record.

With reference to the first aspect of this application and the foregoing possible implementations, in a possible implementation, the storage node $N_j$ receives a read request sent by a third client, where the read request includes the logical address; the storage node $N_j$ determines, by querying the record based on the logical address, that the data of the strip $SU_{Kj}$ is latest data; and the storage node $N_j$ returns the data of $SU_{Kj}$ to the third client.

With reference to the first aspect of this application and the foregoing possible implementations, in a possible implementation, the strip $SU_{Nj}$ and the strip $SU_{Kj}$ are allocated from the storage node $N_j$ by a stripe metadata server.

A second aspect of this application provides a storage node in a distributed storage system. The distributed storage system includes M storage nodes $N_j$, where j is an integer ranging from 1 to M. The storage node serves as the storage node $N_j$, and includes a plurality of units that are configured to implement the first aspect of this application and various implementations of the first aspect.

A third aspect of this application provides a storage node in a distributed storage system. The distributed storage system includes M storage nodes $N_j$, where j is an integer ranging from 1 to M. The storage node serves as the storage node $N_j$, and includes an interface and a processor that communicate with each other. The processor is configured to implement the first aspect of this application and various implementations of the first aspect.

A fourth aspect of this application provides a computer program product. The computer program product includes a computer instruction, and the computer instruction is used by a storage node in a distributed storage system. The distributed storage system includes M storage nodes $N_j$, where j is an integer ranging from 1 to M. The storage node serves as the storage node $N_j$, and runs the computer instruction to implement the first aspect of this application and various implementations of the first aspect.

A fifth aspect of this application provides a data storage method in a distributed storage system. The distributed storage system includes M storage nodes $N_j$, where j is an integer ranging from 1 to M. The method includes: A first client receives a first write request, where the first write request includes first data and a logical address; the first client divides the first data into data of one or more strips $SU_{Nj}$ in a stripe $S_N$, where the stripe $S_N$ includes M strips $SU_{Nj}$; the first client sends the data of the one or more strips $SU_{Nj}$ to the storage node $N_j$; a second client receives a second write request, where the second write request includes second data and the logical address; the second client divides the third data into data of one or more strips $SU_{Kj}$ of a stripe $S_K$, where N is different from K, and the stripe $S_K$ includes M strips $SU_{Kj}$; and the second client sends the data of the one or more strips $SU_{Kj}$ to the storage node $N_j$.

With reference to the fifth aspect of this application, in a possible implementation, the strip $SU_{Nj}$ and the strip $SU_{Kj}$ are allocated from the storage node $N_j$ by a stripe metadata server.

With reference to the fifth aspect of this application, in a possible implementation, each piece of the data of the one or more strips $SU_{Nj}$ further includes data strip status information, and the data strip status information is used to indicate whether each data strip in the stripe $S_N$ is empty.

DESCRIPTION OF EMBODIMENTS

Figure 1:
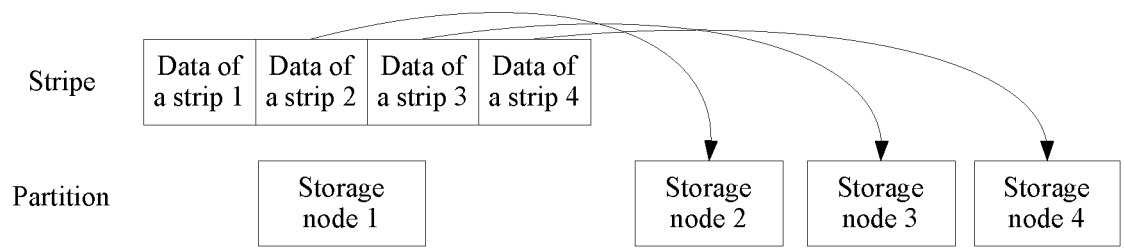
FIG. 1 is a schematic diagram of data storage in a distributed storage system.
Figure 2:
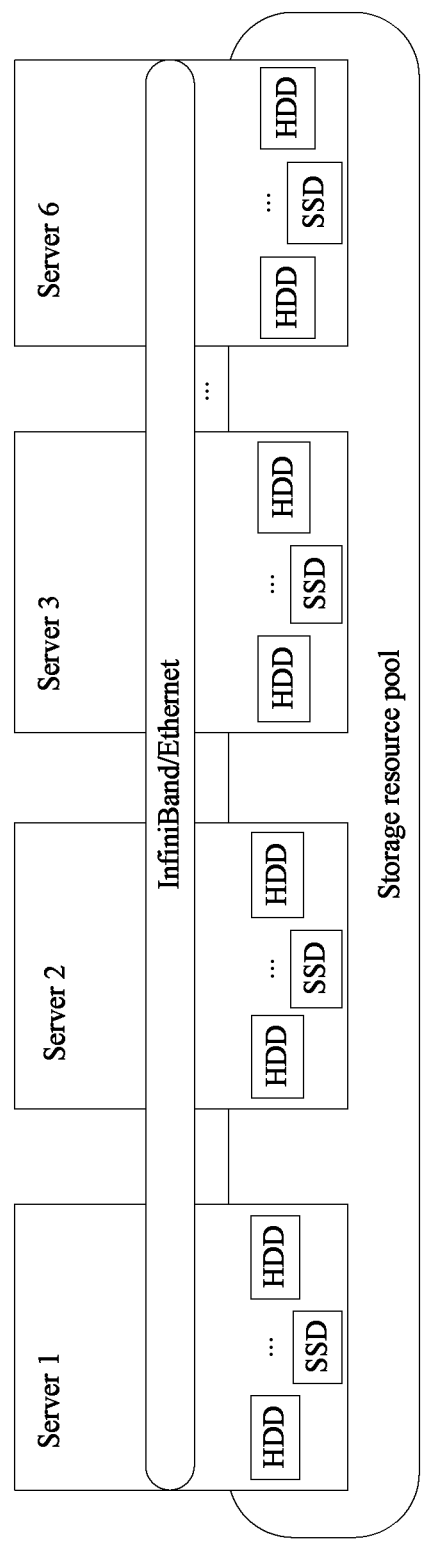
FIG. 2 is a schematic diagram of a distributed block storage system according to an embodiment of the present disclosure.

A distributed storage system in an embodiment of the present disclosure includes a Huawei® Fusionstorage® series and an OceanStor® 9000 series. For example, as shown in FIG. 2, the distributed storage system includes a plurality of servers such as a server 1, a server 2, a server 3, a server 4, a server 5, and a server 6. The servers communicate with each other by using InfiniBand, an Ethernet, or the like. In this embodiment of the present disclosure, the server in the distributed storage system is also referred to as a storage node. In actual application, a quantity of servers in the distributed storage system may be increased based on an actual requirement. This is not limited in this embodiment of the present disclosure.

Figure 3:
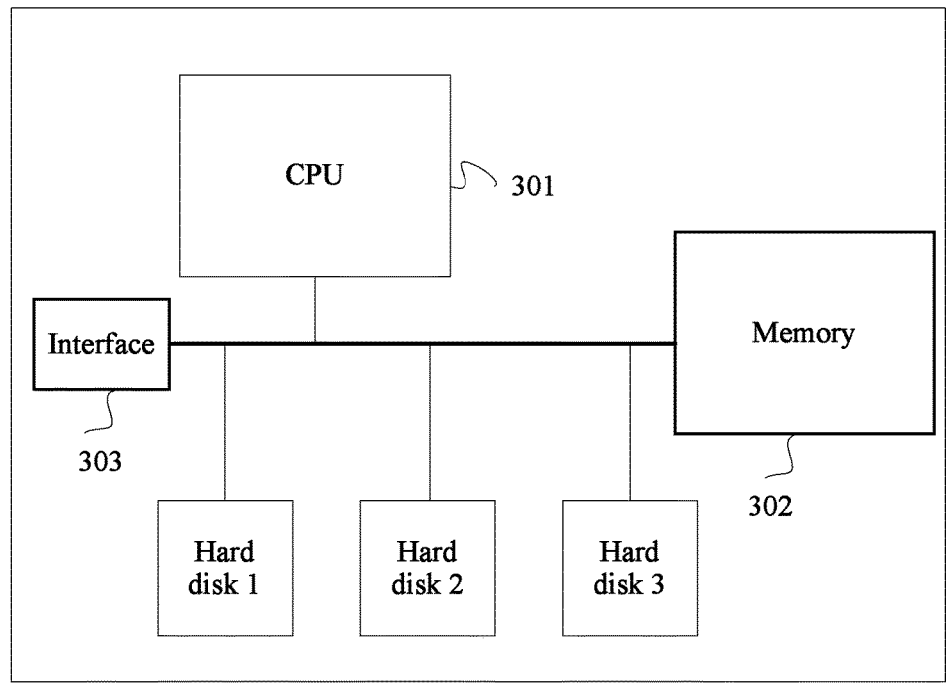
FIG. 3 is a schematic structural diagram of a server in a distributed block storage system according to an embodiment of the present disclosure.

The server in the distributed storage system includes a structure shown in FIG. 3. As shown in FIG. 3, each server in the distributed storage system includes a central processing unit (CPU) 301, a memory 302, an interface 303, a hard disk 1, a hard disk 2, and a hard disk 3. The memory 302 stores a computer instruction. The CPU 301 executes the computer instruction in the memory 302 to perform a corresponding operation. The interface 303 may be a hardware interface such as a network interface card (NIC) or a host bus adapter (HBA), or may be a program interface module or the like. The hard disk includes a solid-state disk (SSD), a mechanical hard disk, or a hybrid hard disk. For example, the mechanical hard disk is an hard disk drive (HDD). A hard disk interface may be a serial advanced technology attachment (SATA) interface, a serial attached small computer system interface (SAS) interface, a fiber channel (FC) interface, a Peripheral Component Interconnect Express (PCIe) interface, a Non-Volatile Memory Express (NVMe) interface, or the like. The CPU 201 may be replaced with a field-programmable logic gate array (FPGA) or other hardware. Alternatively, an FPGA or other hardware and the CPU 301 jointly perform the foregoing corresponding operation. For ease of description, in this embodiment of the present disclosure, the CPU 301 and the memory 302 are referred to as a processor, or hardware that replaces the CPU 301 and the memory 302 is referred to as a processor, or a combination of the CPU 301, the memory 302, and other hardware is referred to as a processor.

A client in the distributed storage system writes data into the distributed storage system based on a write request from a host or reads data from the distributed storage system based on a read request from a host. The server shown in this embodiment of the present disclosure may serve as the client. In addition, the client may alternatively be a device independent of the server shown in FIG. 3. A form of the host in this embodiment of the present disclosure may be a server, a virtual machine (VM), a terminal device, or the like. This is not limited in this embodiment of the present disclosure. The client in the distributed storage system provides a storage resource in the distributed storage system for the host. For example, in a distributed block storage system, the client provides a block resource such as a logical unit for the host, to provide a data access operation for the host. The logical unit is also referred to as a logical unit number (LUN). In a distributed file storage system, a client provides a file resource for a host. In a distributed object storage system, a client provides an object resource for a host.

In an embodiment of the present disclosure, a distributed block storage system is used as an example. A client provides a block protocol access interface, so that the client provides a distributed block storage access point service. A host may access a storage resource in a storage resource pool in the distributed block storage system by using the client. Usually, the block protocol access interface is configured to provide a LUN for the host. When a distributed block storage system program runs on a server including a hard disk, the server serves as a storage node to store data received by the client. For example, for the server, one hard disk may serve as one storage node by default, in other words, when the server includes a plurality of hard disks, the server may serve as a plurality of storage nodes. In another implementation, when a distributed block storage system program runs on a server, the server serves as one storage node. This is not limited in this embodiment of the present disclosure. Therefore, for a structure of the storage node, refer to FIG. 4 and related description. During initialization of the distributed block storage system, hash space (for example, 0 to 2^32) is divided into N equal parts. Each equal part is one partition, and the N equal parts are equally allocated based on a quantity of hard disks. For example, in the distributed block storage system, N is 3600 by default, in other words, the partitions are P1, P2, P3, . . . , and P3600.

Figure 4:
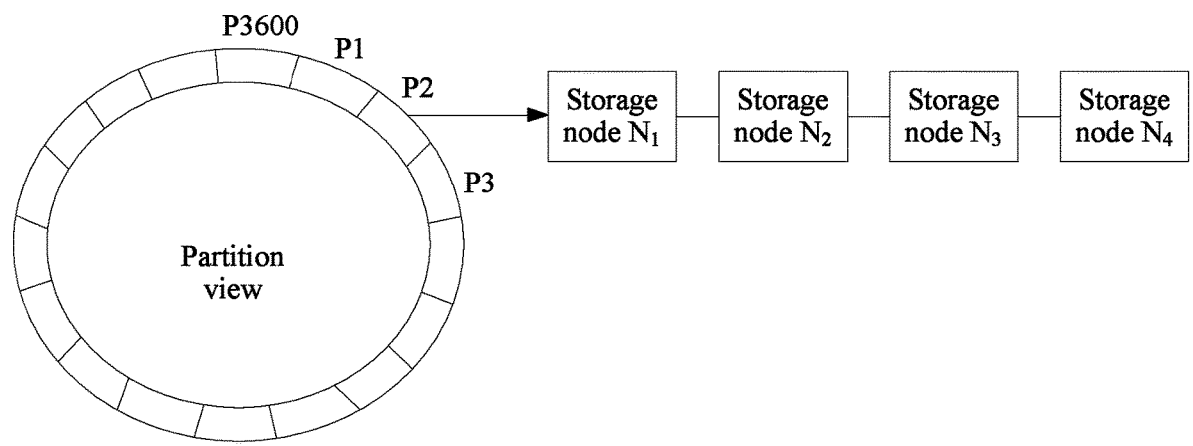
FIG. 4 is a schematic diagram of a partition view of a distributed block storage system according to an embodiment of the present disclosure.

It is assumed that a current distributed block storage system includes 18 hard disks (storage nodes). In this case, each storage node carries 200 partitions. The partition P includes M storage nodes $N_j$. There is a correspondence between the partition and the storage node, namely, a mapping between the partition and the storage node $N_j$ included in the partition, and the correspondence is also referred to as a partition view. As shown in FIG. 4, in an example, the partition includes four storage nodes $N_j$. In this case, the partition view is "P2—storage node $N_1$—storage node $N_2$—storage node $N_3$—storage node $N_4$", where j is an integer ranging from 1 to M. During initialization of the distributed block storage system, the partition view is determined, and is subsequently adjusted based on the quantity of hard disks in the distributed block storage system. In an implementation, the client saves the partition view.

Based on a reliability requirement of the distributed block storage system, data reliability may be improved by using an erasure coding (EC) algorithm. For example, a 3+1 mode is used, three data strips and one check strip constitute a stripe. In this embodiment of the present disclosure, data is stored in the partition in a form of a stripe. One partition includes R stripes $S_i$, where i is an integer ranging from 1 to R. In this embodiment of the present disclosure, P2 is used as an example for description.

Figure 5:
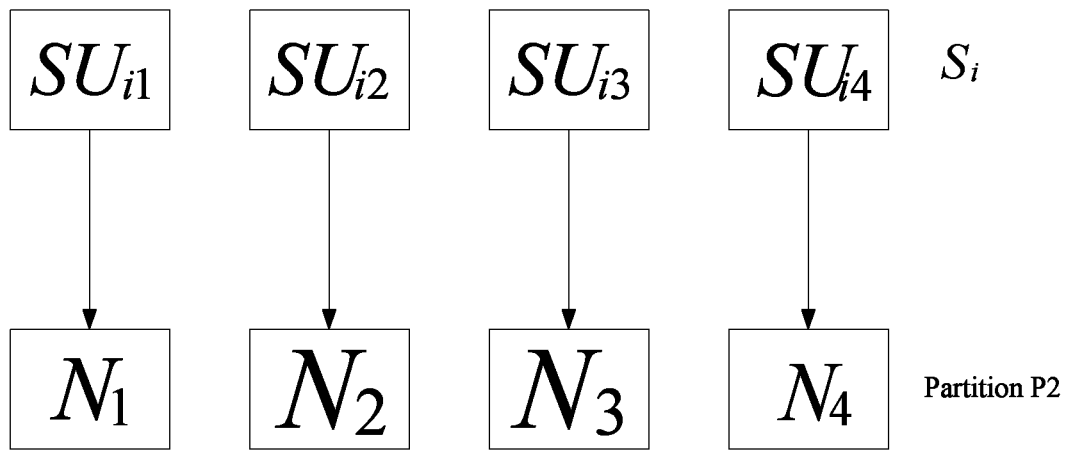
FIG. 5 is a schematic diagram of a relationship between a strip and a storage node in a distributed block storage system according to an embodiment of the present disclosure.

In the distributed block storage system, fragment management is performed on the hard disk in a unit of 8 kilobytes (KB), and allocation information of each 8 KB fragment is recorded in a metadata management area of the hard disk. The fragments of the hard disk constitute the storage resource pool. The distributed block storage system includes a stripe metadata server. A implementation may be that a stripe management program runs on one or more servers in the distributed block storage system. The stripe metadata server allocates a stripe to the partition. The partition view shown in FIG. 5 is still used as an example. As shown in FIG. 5, the stripe metadata server allocates, based on the partition view, a storage address, namely, storage space, to a strip $SU_{ij}$ in a stripe $S_i$ in the partition P2 from a storage node $N_j$ corresponding to the partition. The stripe metadata server allocates a storage address to $SU_{i1}$ from the storage node $N_1$, allocates a storage address to $SU_{i2}$ from the storage node $N_2$, allocates a storage address to $SU_{i3}$ from the storage node $N_3$, and allocates a storage address to $SU_{i4}$ from the storage node $N_4$. In another implementation, the stripe metadata server does not allocate a storage address to a strip $SU_{ij}$ in a stripe $S_i$ in the partition P2 from a storage node $N_j$ corresponding to the partition. When the client writes data into the storage node, the storage node $N_j$ allocates a storage address to the strip $SU_{ij}$ in the stripe. The storage address allocated to the strip $SU_{ij}$ may be a logical address, for example, a logical block address (LBA), of a hard disk in the storage node $N_j$. In another implementation, in an SSD that supports an open channel, the storage address allocated by the stripe metadata server to the strip $SU_{ij}$ in the stripe from the storage node $N_j$ may alternatively be a physical address of the SSD. In another implementation, the hard disk in the storage node $N_j$ is a LUN, namely, a LUN connected to the storage node. Stripe metadata records a mapping relationship between a stripe identifier and a strip identifier, namely, a correspondence between $S_i$ and a strip $SU_{ij}$ in the stripe, and a strip $SU_{ij}$ included in a stripe $S_i$ can be found based on the correspondence. Further, the stripe metadata server further records a correspondence between a strip $SU_{ij}$ and a stripe $S_i$, and based on the correspondence, a stripe $S_i$ can be found by using a strip $SU_{ij}$, so that stripe information, for example, all strips $SU_{ij}$ included in $S_i$, is queried.

To reduce a quantity of strip identifiers managed by the stripe metadata server, the stripe metadata server allocates a version number to an identifier of a strip in a stripe. After a stripe is released, a version number of a strip identifier of a strip in the released stripe is updated, so that the strip identifier is used as a strip identifier of a strip in a new stripe. The stripe metadata server pre-allocates a strip $SU_{ij}$ to a stripe $S_i$, so that waiting time can be reduced when the client writes data, thereby improving write performance of the distributed block storage system. In this embodiment of the present disclosure, the strip $SU_{ij}$ in the stripe $S_i$ has a unique identifier in the distributed block storage system.

In this embodiment of the present disclosure, a logical unit allocated by the distributed block storage system is connected to the client, to perform a data access operation. The logical unit is also referred to as a logical unit number (LUN). In the distributed block storage system, one logical unit may be connected to only one client, or one logical unit may be connected to a plurality of clients, that is, a plurality of clients share one logical unit. The logical unit is provided by a storage resource pool shown in FIG. 2.

Figure 6:
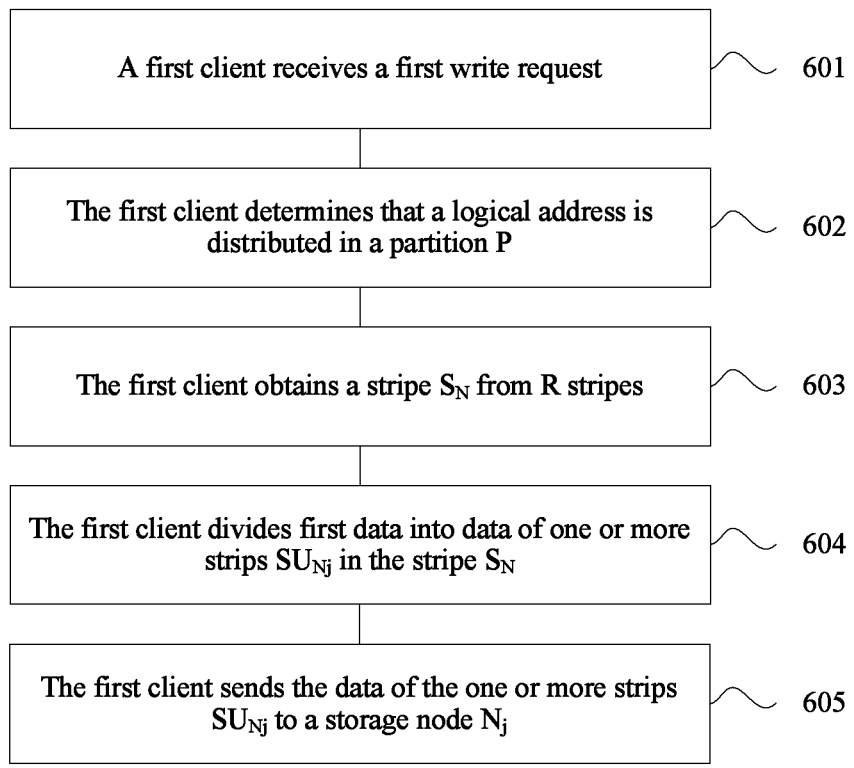
FIG. 6 is a flowchart of a method for writing data by a client in a distributed block storage system according to an embodiment of the present disclosure.

In an embodiment of the present disclosure, as shown in FIG. 6, this embodiment of the present disclosure includes the following steps:

Step 601: A first client receives a first write request.

The first write request includes first data and a logical address. In a distributed block storage system, the distributed block storage system provides an LBA of a LUN. The logical address is used to indicate a writing position of the first data in the LUN.

Step 602: The first client determines that the logical address is distributed in a partition P.

Figure 7:
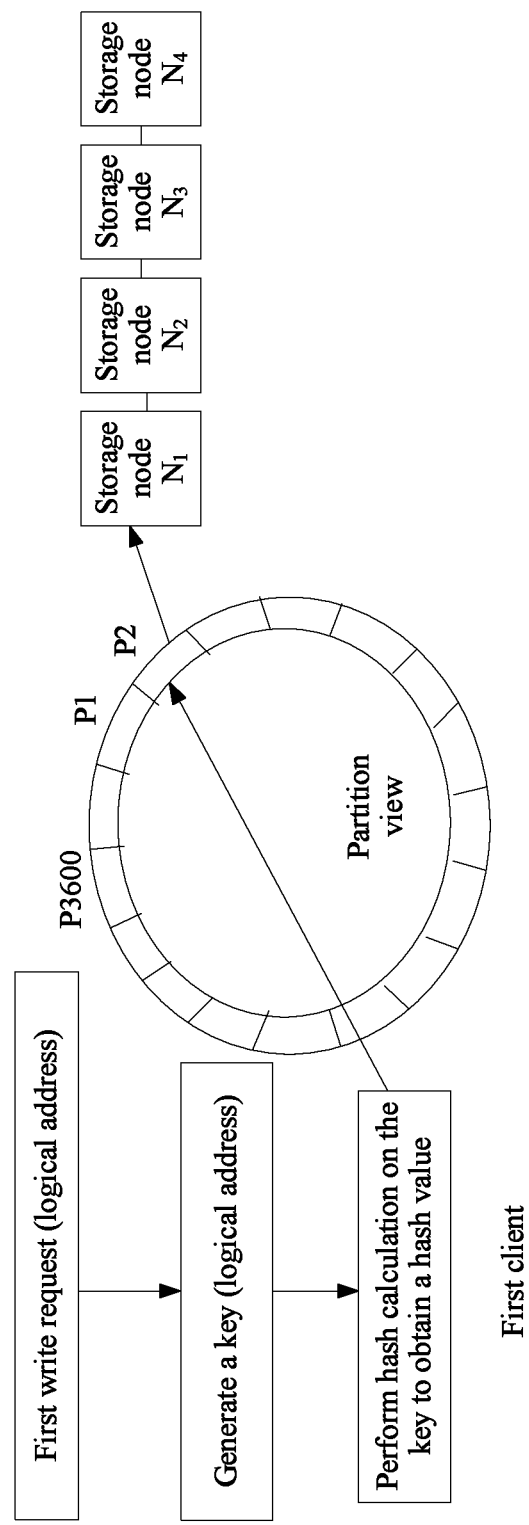
FIG. 7 is a schematic diagram of determining a partition by a client in a distributed block storage system according to an embodiment of the present disclosure.

In this embodiment of the present disclosure, a partition P2 is used as an example. With reference to FIG. 4, the first client stores a partition view of the distributed block storage system. As shown in FIG. 7, the first client determines, based on the partition view, the partition in which the logical address included in the first write request is located. In an implementation, the first client generates a key based on the logical address, calculates a hash value of the key according to a hash algorithm, determines a partition corresponding to the hash value, and therefore determines that the logical address is distributed in the partition P2. In other words, the first data is distributed in the partition P2.

Step 603: The first client obtains a stripe $S_N$ from R stripes, where N is an integer ranging from 1 to R.

A stripe metadata server manages a correspondence between a partition and a stripe and a relationship between a strip in a stripe and a storage node. An implementation in which the first client obtains the stripe $S_N$ from the R stripes is as follows: The first client determines that the logical address is distributed in the partition P2, and the first client queries the stripe metadata server to obtain the stripe $S_N$ in the R stripes included in the partition P2. The logical address is an address used for writing data by the client in the distributed block storage system. Therefore, that the logical address is distributed in the partition P represents a same meaning as that the first data is distributed in the partition P. Another implementation in which the first client obtains the stripe $S_N$ from the R stripes may be as follows: The first client obtains the stripe $S_N$ from a stripe in the R stripes that is allocated to the first client. A client may store a mapping relationship between a partition and a stripe. The client may cache a stripe allocated by the stripe metadata server.

Step 604: The first client divides the first data into data of one or more strips $SU_{Nj}$ in the stripe $S_N$.

The stripe $S_N$ includes a strip. The first client receives the first write request, caches the first data included in the first write request, and divides the cached data based on a size of the strip in the stripe. For example, the first client divides the data based on a length of the strip in the stripe to obtain data of a strip size, performs a modulo operation on a quantity M (for example, 4) of storage nodes in the partition based on the logical address of the data of the strip size, to determine a location of the data of the strip size in the stripe, namely, a corresponding strip $SU_{Nj}$, and further determines, based on the partition view, a storage node $N_j$ corresponding to the strip $SU_{Nj}$. Therefore, data of strips with a same logical address is distributed in a same storage node. For example, the first data is divided into data of one or more strips $SU_{Nj}$. In this embodiment of the present disclosure, P2 is used as an example. With reference to FIG. 5, the stripe $S_N$ includes four strips: $SU_{N1}$, $SU_{N2}$, $SU_{N3}$, and $SU_{N4}$. In an example, the first data is divided into data of two strips, namely, data of $SU_{N1}$ and data of $SU_{N2}$. Data of the strip $SU_{N3}$ may be obtained through division of data in another write request received by the first client. For details, refer to a description of a first request. Further, data of the check strip $SU_{N4}$ is generated based on the data of $SU_{N1}$, the data of $SU_{N2}$, and the data of $SU_{N3}$. The data of the check strip $SU_{N4}$ is also referred to as check data. For how to generate data of a check strip based on data of a data strip in a stripe, refer to an existing stripe implementation algorithm. Details are not described in this embodiment of the present disclosure.

In this embodiment of the present disclosure, the stripe $S_N$ includes four strips, namely, three data strips and one check strip. When the first client caches data for more than a period of time, the first client needs to write the data into the storage node. When the data cannot fill the data stripe, for example, there is only the data of the strip $SU_{N1}$ and the data of $SU_{N2}$ that are obtained through division of the first data, the check strip is generated based on the data of $SU_{N1}$ and the data of $SU_{N2}$. Optionally, data of a valid data strip $SU_{Nj}$ includes data strip status information of the stripe $S_N$, and the valid data strip $SU_{Nj}$ is a strip that is not empty. In this embodiment of the present disclosure, the data of the valid data strip $SU_{N1}$ and the data of the valid data strip $SU_{N2}$ both include the data strip status information of the stripe $S_N$, and the data strip status information is used to indicate whether each data strip in the stripe $S_N$ is empty. For example, 1 is used to indicate that the data strip is not empty, and 0 is used to indicate that the data strip is empty. In this case, the data strip status information included in the data of $SU_{N1}$ is 110, and the data strip status information included in the data of $SU_{N2}$ is 110, which indicates that $SU_{N1}$ is not empty, $SU_{N2}$ is not empty, and $SU_{N3}$ is empty. The data of the check strip $SU_{N4}$ generated based on the data of $SU_{N1}$ and the data of $SU_{N2}$ includes check data of the data strip status information. Because $SU_{N3}$ is empty, the first client does not need to replace the data of $SU_{N3}$ with all-0 data and write the all-0 data into the storage node $N_3$, thereby reducing an amount of written data. When reading the stripe $S_N$, the first client determines, based on the data strip status information of the stripe $S_N$ included in the data of the data strip $SU_{N1}$ or the data of the data strip $SU_{N2}$, that $SU_{N3}$ is empty.

When $SU_{N3}$ is not empty, the data strip status information included in the data of $SU_{N1}$, the data of $SU_{N2}$, and the data of $SU_{N3}$ in this embodiment of the present disclosure is 111, and the data of the check strip $SU_{N4}$ generated based on the data of $SU_{N1}$, the data of $SU_{N2}$, and the data of $SU_{N3}$ includes the check data of the data strip status information.

In this embodiment of the present disclosure, the data of the data strip $SU_{Nj}$ further includes metadata, such as an identifier of the data strip $SU_{Nj}$ and a logical address of the data of the data strip $SU_{Nj}$.

Step 605: The first client sends the data of the one or more strips $SU_{Nj}$ to the storage node $N_j$.

In this embodiment of the present disclosure, the first client sends the data of $SU_{N1}$ obtained through division of the first data to a storage node $N_1$, and sends the data of $SU_{N2}$ obtained through division of the first data to a storage node $N_2$. The first client may concurrently send the data of the strip $SU_{Nj}$ in the stripe $S_N$ to the storage node $N_j$, without requiring a primary storage node, so that data interaction between storage nodes is reduced, write concurrency is improved, and write performance of the distributed block storage system is improved.

Further, when only the first client writes data into the LUN provided by the distributed block storage system, the first client receives a second write request. The second write request includes second data and the logical address described in FIG. 6. The first client determines, according to the algorithm described in the process in FIG. 6, that the logical address is distributed in the partition P2. The first client obtains a stripe $S_K$ from the R stripes and divides the second data into data of one or more strips $SU_{Kj}$ in the stripe $S_K$, such as data of $SU_{K1}$ and data of $SU_{K2}$. The first client sends the data of the one or more strips $SU_{Kj}$ to the storage node $N_j$. That is, the data of $SU_{K1}$ is sent to the storage node $N_1$, and the data of $SU_{K2}$ is sent to the storage node $N_2$, where K is an integer ranging from 1 to R, and N is different from K. In this embodiment of the present disclosure, that the logical address is distributed in the partition P represents a same meaning as that the second data is distributed in the partition P. Further, data of the valid data strip $SU_{Kj}$ includes data strip status information of a stripe KY. Further, the data of the data strip $SU_{Kj}$ further includes metadata of the data of the data strip $SU_{Kj}$, such as an identifier of the strip $SU_{Kj}$ and a logical address of the data of the strip $SU_{Kj}$. For a further description, refer to the description of the first client in FIG. 6, and details are not repeatedly described herein. For a meaning of that the first client obtains the stripe $S_K$ from the R stripes, refer to the meaning of that the first client obtains the stripe $S_N$ from the R stripes, and details are not repeatedly described herein.

In another implementation, when a plurality of clients such as the first client and a second client write data into the LUN provided by the distributed block storage system, the second client may perform the foregoing operation of the second write request performed by the first client.

Further, when one logical unit is connected to a plurality of clients such as the first client and the second client, the second client receives a third write request, and the third write request includes third data and the logical address described in FIG. 6. The second client determines, according to the algorithm described in the process in FIG. 6, that the logical address is distributed in the partition P2. The second client obtains a stripe $S_K$ from the R stripes and divides the third data into data of one or more strips $SU_{Kj}$ in the stripe $S_K$, such as data of $SU_{K1}$ and data of $SU_{K2}$. The second client sends the data of the one or more strips $SU_{Kj}$ to the storage node $N_j$. That is, the data of $SU_{K1}$ is sent to the storage node $N_1$, and the data of $SU_{K2}$ is sent to the storage node $N_2$, where K is an integer ranging from 1 to R, and N is different from K. That the logical address is distributed in the partition P represents a same meaning as that the third data is distributed in the partition P. For a meaning of that the second client obtains the stripe $S_K$ from the R stripes, refer to the meaning of that the first client obtains the stripe $S_N$ from the R stripes, and details are not repeatedly described herein. Further, data of the valid data strip $SU_{Kj}$ includes data strip status information of the stripe $S_K$. Further, the data of the data strip $SU_{Kj}$ further includes at least one of an identifier of the second client and a timestamp $TP_K$ of the stripe $S_K$ obtained by the second client. Further, the data of the data strip $SU_{Kj}$ further includes metadata, such as an identifier of the data strip $SU_{Kj}$ and a logical address of the data of the data strip $SU_{Kj}$. For a further description of the second client, refer to the description of the first client in FIG. 6, and details are not repeatedly described herein.

In the embodiment shown in FIG. 6, the client divides the data into the data of the strips, and sends the data of the strips to the corresponding storage nodes, without requiring the primary storage node, so that pressure on the primary storage node is reduced, and data interaction between the storage nodes is reduced. In addition, the data of the strips in the stripe is concurrently written into the corresponding storage nodes, so that write performance of the distributed block storage system is improved.

Figure 8:
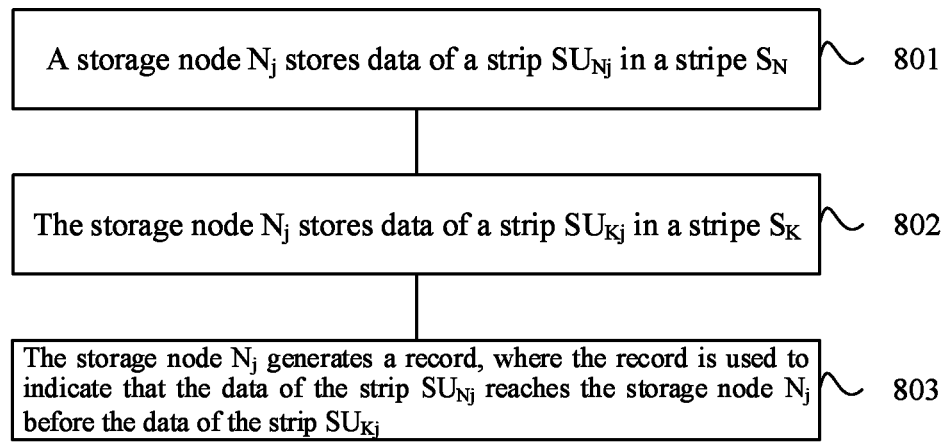
FIG. 8 is a flowchart of a method for storing data by a storage node in a distributed block storage system according to an embodiment of the present disclosure.

Corresponding to the embodiment of the first client shown in FIG. 6, as shown in FIG. 8, a storage node $N_j$ performs the following steps.

Step 801: The storage node $N_j$ stores data of a strip $SU_{Nj}$ in a stripe $S_N$.

With reference to the embodiment shown in FIG. 6, the storage node $N_1$ receives the data of $SU_{N1}$ sent by the first client, the storage node $N_2$ receives the data of $SU_{N2}$ sent by the first client, the storage node $N_3$ receives the data of $SU_{N3}$ sent by the first client, and a storage node $N_4$ receives the data of $SU_{N4}$ sent by the first client. The stripe $S_N$ includes M strips $SU_{Nj}$, namely, the strip $SU_{N1}$ to a strip $SU_{NM}$.

Step 802: The storage node $N_j$ stores data of a strip $SU_{Kj}$ in a stripe $S_K$.

With reference to the embodiment shown in FIG. 6, the storage node $N_1$ receives the data of $SU_{K1}$ sent by the first client, the storage node $N_2$ receives the data of $SU_{K2}$ sent by the first client, the storage node $N_3$ receives data of $SU_{K3}$ sent by the first client, and the storage node $N_4$ receives data of $SU_{K4}$ sent by the first client. The stripe $S_K$ includes M strips $SU_{Kj}$, namely, the strip $SU_{K1}$ to a strip $SU_{KM}$. A logical address of the data of the strip $SU_{Kj}$ is the same as a logical address of the data of the strip $SU_{Nj}$. In another embodiment of the present disclosure, the data of the strip $SU_{Kj}$ in the stripe $S_K$ is sent by a second client.

Step 803: The storage node $N_j$ generates a record, where the record is used to indicate that the data of the strip $SU_{Nj}$ reaches the storage node $N_j$ before the data of the strip $SU_{Kj}$.

In an implementation of this embodiment of the present disclosure, the record indicates, based on an identifier of the strip $SU_{Nj}$ and an identifier of the strip $SU_{Kj}$, that the data of the strip $SU_{Nj}$ reaches the storage node $N_j$ before the data of the strip $SU_{Kj}$, so that data consistency is ensured based on the record. That is, the identifier of the strip $SU_{Nj}$ and the identifier of the strip $SU_{Kj}$ are used as an entry. In the entry, a sequence of the data of the two strips in reaching the storage node $N_j$ may be represented by a sequence of the identifiers of the two strips. In another implementation, in the entry, a sequence of the data of the two strips in reaching the storage node $N_j$ may alternatively be represented by a combination of the identifiers of the two strips and other symbols.

In this embodiment of the present disclosure, the storage node $N_j$ backs up the record to one or more other storage nodes in M storage nodes. For example, using the storage node $N_1$ as an example, the record may be backed up to one or more of the storage node $N_2$, the storage node $N_3$, and the storage node $N_4$, so that reliability of the record can be improved, and the record is prevented from being lost when the storage node $N_1$ becomes faulty. The storage node $N_j$ stores an identifier of the storage node in which the record is backed up. In another implementation, because the stored identifier of the storage node in which the record is backed up is lost when the storage node $N_j$ becomes faulty, the data of the strip $SU_{Kj}$ between the restored data of the strip $SU_{Nj}$ and the restored data of the strip $SU_{Kj}$ cannot be determined as latest data. To prevent this, a backup relationship of the record between the M storage nodes may be alternatively determined by a stripe metadata server.

In this embodiment of the present disclosure, the storage node $N_j$ further records a mapping between the logical address of the data of the strip $SU_{Nj}$ and the identifier of the strip $SU_{Nj}$, and a mapping between the logical address of the data of the strip $SU_{Kj}$ and the identifier of the strip $SU_{Kj}$. For ease of querying the record stored by the storage node $N_j$, the logical address of the data of the strip may be used as an index to organize the record. The storage node $N_j$ stores the data of the strip $SU_{Nj}$ and records a mapping between the identifier of the strip $SU_{Nj}$ and an address for storing the data of the strip $SU_{Nj}$. The storage node $N_j$ stores the data of the strip $SU_{Kj}$ and records a mapping between the identifier of the strip $SU_{Kj}$ and an address for storing the data of the strip $SU_{Kj}$. In this embodiment of the present disclosure, for a strip storing check data, namely, a check strip, the storage node needs to record a mapping between an identifier of the check strip and an address for storing the data of the check strip, and does not need to record a mapping between a logical address of the data of the check strip and the identifier of the check strip, because the data of the check strip has no logical address.

In this embodiment of the present disclosure, the storage node $N_j$ stores a mapping between a logical address of data of a strip and an identifier of the strip in a cache according to a sequence of receiving the data of the strip. Therefore, the storage node $N_j$ generates the record based on the mapping. In this embodiment of the present disclosure, a record is not required to be generated immediately after the data of the strip is received, and generating the record may be performed as a background task, so that performance of processing the data of the strip by the storage node $N_j$ is improved. When the storage node is configured to store the data of the check strip, namely, the check data, the storage node $N_j$ stores, in the cache according to a sequence of receiving the data of the check strip, the mapping between the identifier of the strip and the logical address of the data of the check strip stored in the storage node $N_j$, and the storage node $N_j$ generates the record based on the mapping. In another implementation, the storage node $N_j$ stores the data of the check strip in the cache according to the sequence of receiving the data of the check strip, and the storage node $N_j$ generates the record based on a sequence of data in the cache.

In this embodiment of the present disclosure, the storage node $N_j$ receives a read request sent by the client, and the read request includes a logical address. Because the logical address of the data of the strip $SU_{Nj}$ is the same as the logical address of the data of the strip $SU_{Kj}$, the storage node $N_j$ further records a mapping between the logical address of the data of the strip $SU_{Nj}$ and the identifier of the strip $SU_{Nj}$, and a mapping between the logical address of the data of the strip $SU_{Kj}$ and the identifier of the strip $SU_{Kj}$. Therefore, latest data, namely, data of a latest version, between the data of the strip $SU_{Nj}$ and the data of the strip $SU_{Kj}$ needs to be determined, to ensure data consistency based on the record. The storage node $N_j$ determines, by querying the stored record based on the logical address, that the data of the strip $SU_{Kj}$ is the latest data. The client may be the first client or the second client, or may be a client other than the first client and the second client.

In this embodiment of the present disclosure, when the storage node $N_j$ becomes faulty and the data of the strip $SU_{Nj}$ and the data of the strip $SU_{Kj}$ are lost, the stripe metadata server restores the data of the strip $SU_{Nj}$ based on data of other strips of the stripe $S_N$ on M−1 storage nodes, and restores the data of the strip $SU_{Kj}$ based on data of other strips of the stripe $S_K$ on the M−1 storage nodes. For example, when the storage node $N_1$ becomes faulty and the data of the strip $SU_{N1}$ and the data of the strip $SU_{K1}$ are lost, the data of the strip $SU_{N1}$ and the data of the strip $SU_{K1}$ are restored in the foregoing manner. In another implementation, restoring the data of the strip may be implemented by the client. The storage node $N_j$ obtains the record from another storage node in which the record is backed up, and determines, between the restored data of the strip $SU_{Nj}$ and the restored data of the strip $SU_{Kj}$ based on the record, that the data of the strip $SU_{Kj}$ is latest data, to ensure data consistency based on the record. The storage node $N_j$ queries the backup relationship of the record between the M storage nodes from the stripe metadata server, determines an identifier of a storage node that stores a record of the storage node $N_j$, and obtains the record of the storage node $N_j$ from the storage node based on the identifier of the storage node.

Figure 9:
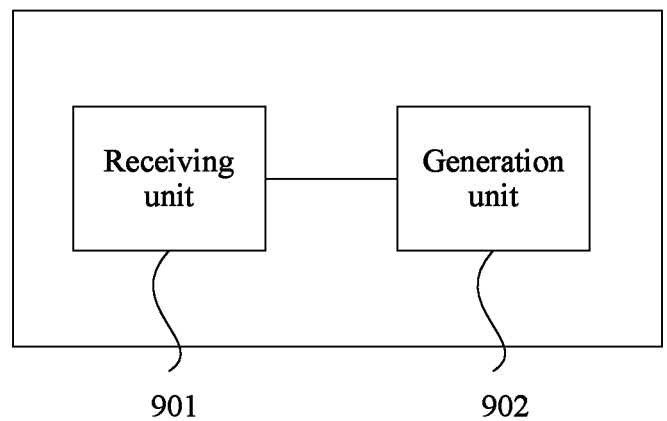
FIG. 9 is a schematic structural diagram of a storage node in a distributed block storage system according to an embodiment of the present disclosure.

With reference to various implementations of the embodiments of the present disclosure, an embodiment of the present disclosure provides a storage node in a distributed storage system as a storage node $N_j$ in the distributed storage system. As shown in FIG. 9, the storage node $N_j$ includes a receiving unit 901 and a generation unit 902. The receiving unit 901 is configured to receive data of a strip $SU_{Nj}$ in a stripe $S_N$ and data of a strip $SU_{Kj}$ in a stripe $S_K$, where the stripe $S_N$ includes M strips $SU_{Nj}$ and the stripe $S_K$ includes M strips $SU_{Kj}$, a logical address of the data of the strip $SU_{Kj}$ is the same as a logical address of the data of the strip $SU_{Nj}$, and N is different from K. The generation unit 902 is configured to generate a record, where the record is used to indicate that the data of the strip $SU_{Nj}$ reaches the storage node $N_j$ before the data of the strip $SU_{Kj}$. The record indicates, based on an identifier of the strip $SU_{Nj}$ and an identifier of the strip $SU_{Kj}$, that the data of the strip $SU_{Nj}$ reaches the storage node $N_j$ before the data of the strip $SU_{Kj}$. In an implementation, the data of the strip $SU_{Nj}$ and the data of the strip $SU_{Kj}$ are sent by a first client. In another implementation, the data of the strip $SU_{Nj}$ is sent by a first client, and the data of the strip $SU_{Kj}$ is sent by a second client.

Further, the storage node $N_j$ shown in FIG. 9 further includes a backup unit that is configured to back up the record to one or more other storage nodes in the M storage nodes.

Further, the storage node $N_j$ shown in FIG. 9 further includes a query determining unit and a returning unit. The receiving unit is further configured to receive a read request sent by a third client, where the read request includes the logical address. The query determining unit is configured to determine, by querying the record based on the logical address, that the data of the strip $SU_{Kj}$ is latest data. The returning unit is configured to return the data of $SU_{Kj}$ to the third client.

Further, the storage node $N_j$ shown in FIG. 9 further includes an obtaining and determining unit that is configured to: when the storage node $N_j$ becomes faulty, obtain the record from a storage node in which the record is backed up, and determine, between the restored data of the strip $SU_{Nj}$ and the restored data of the strip $SU_{Kj}$ based on the record, that the data of the strip $SU_{Kj}$ is latest data.

For an implementation of the storage node shown in FIG. 9 in this embodiment of the present disclosure, refer to the storage node such as the storage node $N_j$ in the embodiments of the present disclosure. In another implementation, a unit in the storage node shown in FIG. 9 may be a software module that may run on a server to make the storage node complete various implementations described in the embodiments of the present disclosure.

An embodiment of the present disclosure further provides a client, including a plurality of units that are configured to implement an operation of the client in this embodiment of the present disclosure. For an implementation of the client, refer to the storage node such as the storage node $N_j$ in the embodiments of the present disclosure. In another implementation, a unit implemented by the client may be a software module that may run on a server to make the storage node complete various implementations described in the embodiments of the present disclosure.

Correspondingly, the embodiments of the present disclosure further provide a computer readable storage medium and a computer program product. The computer readable storage medium and the computer program product include computer instructions used to implement various solutions described in the embodiments of the present disclosure.

Identifiers used to describe the stripe, the data strip, the check strip, and the storage node in the embodiments of the present disclosure are merely intended to describe the embodiments of the present disclosure more clearly, and a similar identifier is not required in actual product implementation. Therefore, the identifiers used to describe the stripe, the data strip, the check strip, and the storage node in the embodiments of the present disclosure are not intended to limit the present disclosure.

In another implementation of this embodiment of the present disclosure, a corresponding strip and storage node may not be queried based on a partition.

In the several embodiments provided in the present disclosure, it should be understood that the disclosed apparatus and method may be implemented in other manners. For example, the unit division in the described apparatus embodiment is merely logical function division and may be another division in actual implementation. For example, a plurality of units or components may be combined or may be integrated into another system, or some features may be ignored or not be performed. In addition, the displayed or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of the present disclosure may be integrated into one processing unit, or each of the units may exist alone physically, or two or more units are integrated into one unit.

What is claimed is:

1. A data storage method implemented by a first storage node in a distributed storage system, comprising:
receiving first data of a first strip in a first stripe, wherein the first stripe comprises a first plurality of strips;
receiving a second data of a second strip in a second stripe, wherein the second stripe comprises a second plurality of strips, wherein a first logical address of the first data is the same as a second logical address of the second data;
generating a record indicating that the first data reached the first storage node before the second data;
backing up the record to one or more second storage nodes; and
when the first storage node becomes faulty, obtaining the record from one of the second storage nodes in which the record is backed up, and determining, based on the record and based on first restored data of the first strip in the first stripe and second restored data of the second strip in the second stripe, that the second data of the second strip in the second stripe is the latest data.

2. The data storage method of claim 1, wherein the record indicates, based on a first identifier of the first strip and a second identifier of the second strip, that the first data reached the first storage node before the second data.

3. The data storage method of claim 1, wherein the first data and the second data are from a first client.

4. The data storage method of claim 1, wherein the first data is from a first client, and wherein the second data is from a second client.

5. The data storage method of claim 1, further comprising receiving an allocation of the first strip and the second strip from a stripe metadata server.

6. The data storage method of claim 1, further comprising:
receiving a read request from a client, wherein the read request comprises a third logical address that is the same logical address as the first logical address and the second logical address;
querying the record based on the same logical address to determine that the second data was received after the first data; and
returning the second data to the client.

7. The data storage method of claim 1, wherein determining that the second data is the latest data comprises determining that the second data is a later version than the first data.

8. A first storage node in a distributed storage system, comprising:
a memory configured to store computer-executable instructions; and
one or more processors coupled to the memory and configured to execute the instructions to cause the first storage node to:
receive first data of a first strip in a first stripe, wherein the first stripe comprises a first plurality of strips;
receive a second data of a second strip in a second stripe, wherein the second stripe comprises a second plurality of strips, wherein a first logical address of the first data is the same as a second logical address of the second data;
generate a record indicating that the first data reached the first storage node before the second data;
back up the record to one or more second storage nodes; and
when the first storage node becomes faulty, obtain the record from one of the second storage nodes in which the record is backed up, and determining, based on the record and based on first restored data of the first strip in the first stripe and second restored data of the second strip in the second stripe, that the second data of the second strip in the second stripe is the latest data.

9. The first storage node of claim 8, wherein the record indicates, based on a first identifier of the first strip and a second identifier of the second strip, that the first data reached the first storage node before the second data.

10. The first storage node of claim 8, wherein the first data and the second data are from a first client.

11. The first storage node of claim 8, wherein the first data is from a first client, and wherein the second data is from a second client.

12. The first storage node of claim 8, wherein the one or more processors are further configured to execute the instructions to cause the first storage node to receive an allocation of the first strip and the second strip from a stripe metadata server.

13. The first storage node of claim 8, wherein the one or more processors are further configured to execute the instructions to cause the first storage node to:
receive a read request from a client, wherein the read request comprises the same logical address as the first logical address and the second logical address;
query the record based on the same logical address to determine that the second data was received after the first data; and
return the second data to the client.

14. The first storage node of claim 8, wherein the one or more processors are further configured to execute the instructions to cause the first storage node to determine that the second data is a later version than the first data.

15. A computer program product comprising computer-executable instructions stored on a non-transitory computer-readable medium that, when executed by one or more processors, cause a first storage node in a distributed storage system to be configured to:
receive first data of a first strip in a first stripe, wherein the first stripe comprises a first plurality of strips;
receive a second data of a second strip in a second stripe, wherein the second stripe comprises a second plurality of strips, wherein a first logical address of the first data is the same as a second logical address of the second data;
generate a record indicating that the first data reached the first storage node before the second data;
back up the record to one or more second storage nodes; and
when the first storage node becomes faulty, obtain the record from one of the second storage nodes in which the record is backed up, and determining, based on the record and based on first restored data of the first strip in the first stripe and second restored data of the second strip in the second stripe, that the second data of the second strip in the second stripe is the latest data.

16. The computer program product of claim 15, wherein the record indicates, based on a first identifier of the first strip and a second identifier of the second strip, that the first data reached the first storage node before the second data.

17. The computer program product of claim 15, wherein the instructions further cause the first storage node to be configured to:
receive a read request from a client, wherein the read request comprises the same logical address as the first logical address and the second logical address;

query the record based on the same logical address to determine that the second data was received after the first data; and return the second data to the client.

18. The computer program product of claim 15, wherein the first data and the second data are from a first client.

19. The computer program product of claim 15, wherein the first data is from a first client, and wherein the second data is from a second client.

20. The computer program product of claim 15, wherein the instructions further cause the first storage node to determine that the second data is a later version than the first data.

* * * * *